United States Patent

Wickliff

[15] 3,665,221

[45] May 23, 1972

[54] TRANSISTOR BRIDGE RECTIFIER CIRCUIT

[72] Inventor: Noble Ervin Wickliff, Indianapolis, Ind.

[73] Assignee: Bell Telephone Laboratories, Incorporated, Murray Hill, Berkeley Heights, N.J.

[22] Filed: Oct. 12, 1970

[21] Appl. No.: 79,899

[52] U.S. Cl. ....................307/255, 307/296, 321/43

[51] Int. Cl. ....................H03m 7/12

[58] Field of Search ....................307/255, 296; 321/43

[56] References Cited

UNITED STATES PATENTS

| | | | |
|---|---|---|---|
| 3,434,034 | 3/1969 | Garber et al. | 307/255 |
| 3,077,545 | 2/1963 | Rywak | 307/255 |
| 3,031,588 | 4/1962 | Hilsenrath | 307/255 |
| 3,237,128 | 2/1966 | Photiades | 307/282 |

*Primary Examiner*—John S. Heyman
*Assistant Examiner*—Harold A. Dixon
*Attorney*—R. J. Guenther and William L. Keefauver

[57] ABSTRACT

The collectors and emitters of two pairs of complementary transistors are interconnected to form a bridge circuit while their bases are connected in a forward biasing sense to a direct-current source. An alternating-current wave applied between one set of opposing corners of the bridge circuit causes a full wave rectified wave to appear between the remaining corners.

2 Claims, 1 Drawing Figure

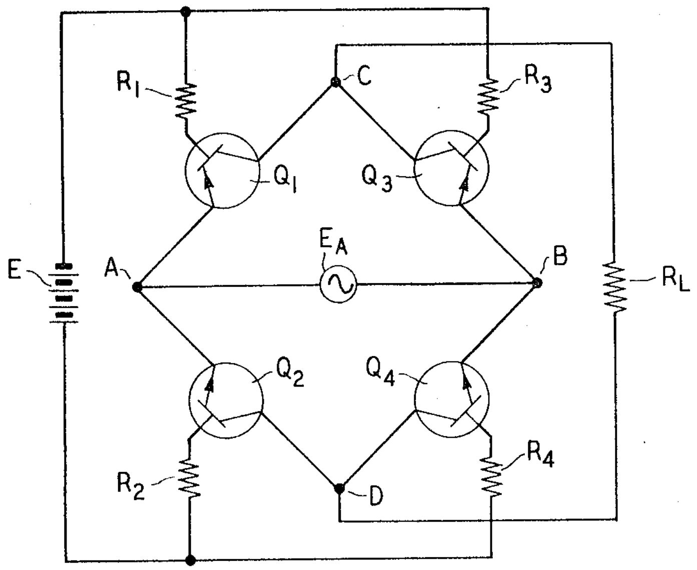
INVENTOR
N. E. WICKLIFF
BY H. L. Logan
ATTORNEY

TRANSISTOR BRIDGE RECTIFIER CIRCUIT

GOVERNMENT CONTRACT

The invention herein claimed was made in the course of or under a contract with the Department of the Army.

BACKGROUND OF THE INVENTION

1. Field of the Invention

This invention relates to full wave rectifier circuits of the bridge type.

2. Description of the Prior Art

Full wave bridge rectifier circuits utilizing diodes are well known in the art. Although these circuits are useful for many applications, the voltage losses introduced by the diodes have sometimes been found unacceptable when rectifying relatively low level A.C. voltages. This is true, for example, when rectifying relatively low level A.C. voltages to produce D.C. voltages for metering purposes.

SUMMARY OF THE INVENTION

An object of the invention is to reduce voltage losses occurring in full wave bridge rectifier circuits.

This and other objects of the invention are achieved by interconnecting the emitters and collectors of two pairs of complementary transistors to form a bridge circuit and, furthermore, by connecting a direct-current source to the bases of the transistors to forward bias their base-emitter junctions. In particular, the emitters of the transistors in one pair are connected together to form a bridge input terminal while the emitters of the transistors in the other pair are similarly connected together to form a second bridge input terminal. On the other hand, the collectors of the transistors in one of the pairs are connected respectively to the collectors of similar types of transistors in the other pair to form a pair of output terminals. Finally, the direct-current source is resistively connected in a forward biasing sense between the bases of the transistors in one of the pairs and, furthermore, between the bases of the transistors in the other pair so as to overcome the combined emitter-base threshold voltage of each pair.

When operating temperatures require the use of silicon devices, use of the present invention has reduced voltage losses from approximately 1.5 volts to approximately 50 millivolts.

These and other objects and features of the invention will become apparent from a study of the following detailed description of a specific embodiment.

BRIEF DESCRIPTION OF THE DRAWING

The drawing shows a schematic diagram of one embodiment of the invention.

DESCRIPTION OF THE DISCLOSED EMBODIMENT

The embodiment shown by way of the schematic diagram of the drawing includes a first pair of complementary transistors $Q_1$ and $Q_2$ and a second pair of complementary transistors $Q_3$ and $Q_4$. Transistors $Q_1$ and $Q_3$ are of the PNP type while transistors $Q_2$ and $Q_4$ are of the NPN type. The emitters of complementary transistors $Q_1$ are $Q_2$ are directly connected together to form one input terminal A while the emitters of complementary transistors $Q_3$ and $Q_4$ are similarly directly connected together to form a second input terminal B. On the other hand, the collectors of similar type transistors $Q_1$ and $Q_3$ are directly connected together to form a first output terminal C while the collectors of similar type transistors $Q_2$ and $Q_4$ are similarly directly connected together to form a second output terminal D.

The bases of transistors $Q_1$ and $Q_3$ are connected by way of resistors $R_1$ and $R_3$, respectively, to the negative terminal of a direct-current source E. Similarly, the bases of transistors $Q_2$ and $Q_4$ are connected by way of resistors $R_2$ and $R_4$, respectively, to the positive terminal of source E. Source E supplies a potential large enough to overcome the emitter-base threshold voltages of transistors $Q_1$ through $Q_4$ in the absence of any voltage being applied to input terminals A and B. Resistors $R_1$ through $R_4$, on the other hand, have resistance values to provide sufficient isolation between source E and loads connected to output terminals C and D.

In the drawing, an A.C. source $E_A$ is shown as connected to input terminals A and B while a load $R_L$ is shown as connected to output terminals C and D. When input terminal A is positive with respect to input terminal B, transistors $Q_1$ and $Q_4$ are conducting while transistors $Q_2$ and $Q_3$ are nonconducting. This may be appreciated by considering the emitter-to-base voltage of transistor $Q_3$. In particular, from elementary circuit theory, the voltage drop across the series combination of resistor $R_4$ and the base-to-emitter path of transistor $Q_4$ is $(E + E_A)/2$, while the emitter-to-base potential of transistor $Q_3$ is $(E - E_A)/2$. As E/2 is approximately the emitter-to-base threshold voltage of transistor $Q_3$, this transistor rapidly turns off as source $E_A$ drives terminal A positive with respect to terminal B. Transistor $Q_2$ is rapidly turned off in a similar manner.

The opposite action occurs with respect to transistors $Q_1$ through $Q_4$ when source $E_A$ drives terminal B positive with respect to terminal A.

When the voltage from source $E_A$ is at a zero level or very close thereto, a very minute reverse current flows through load resistor $R_L$. The reason for this and its order of magnitude may be appreciated by considering source $E_A$ to present a short circuit between terminals A and B. In this case current from source E flows through all of the emitter-base paths of transistors $Q_1$ through $Q_4$. When using silicon transistors, the potentials at the bases of transistors $Q_2$ and $Q_4$ are approximately 1½ volts more positive than those at the bases of transistors $Q_1$ and $Q_3$. This potential difference causes a slight current to flow through the base-to-collector paths of transistors $Q_2$ and $Q_4$, through resistor $R_L$ and the collector-to-base paths of transistors $Q_1$ and $Q_3$. This current, of course, is opposite to that caused by $E_A$ in resistor $R_L$. In general this current will not present a problem because of its relatively small magnitude and duration. With a 10,000 ohm load, for example, this current has been found to be less than 0.005 milliamperes.

An embodiment of the invention using silicon transistors was compared with bridge rectifiers using silicon diodes and germanium diodes. For a 4 volt peak-to-peak A.C. input, the output errors produced when using silicon diodes, germanium diodes, and silicon transistors were found to be approximately 50 percent, 20 percent, and less than 2 percent, respectively. For a four-tenths of a volt peak-to-peak A.C. input, these errors were found to be approximately 100 percent, 70 percent, and 25 percent, respectively. The improvements thus produced are achieved as a result of virtually eliminating nonlinearities in the rectified output caused by threshold voltages introduced by diode rectifiers.

What is claimed is:

1. In combination, first and second NPN transistors each having an emitter, a base and a collector, first and second PNP transistors each having an emitter, a base and a collector, a pair of input terminals for receiving an alternating current voltage, a substantially zero impedance conducting path connected between one of said input terminals and said emitters of said first NPN and PNP transistors, a substantially zero impedance conducting path connected between the other of said input terminals and said emitters of said second NPN and PNP transistors, a pair of output terminals, a substantially zero impedance conducting path connected between one of said output terminals and said collectors of said NPN transistors, a substantially zero impedance conducting path connected between the other of said output terminals and said collectors of said PNP transistors, a single direct-current source, and resistance means connected between said direct current source and said bases to forward bias the base-emitter paths of said transistors in the absence of any voltage applied between said input terminals.

2. In combination, first and second pairs of NPN and PNP complementary transistors where each transistor has an emitter, a base and a collector, a pair of input terminals, a pair of output terminals, a first substantially zero impedance conducting path connecting one of said input terminals to said emitters of said first pair of complementary transistors, a second substantially zero impedance conducting path connecting the other of said input terminals to said emitters of said second pair of complementary transistors, a third substantially zero impedance conducting path connecting one of said output terminals to said collectors of said NPN transistors in said pairs of complementary transistors, a fourth substantially zero impedance conducting path connecting the other of said output terminals to said collectors of said PNP transistors in said pairs of complementary transistors, a single direct-current source, and resistance means connected between said direct-current source and said bases to forward bias the base-emitter paths of said transistors in the absence of any voltage applied between said input terminals.

* * * * *